Aug. 12, 1952     A. E. REHNBERG     2,606,771
COMBINATION WHEELBARROW AND TRAILER
Filed March 26, 1947     2 SHEETS—SHEET 1
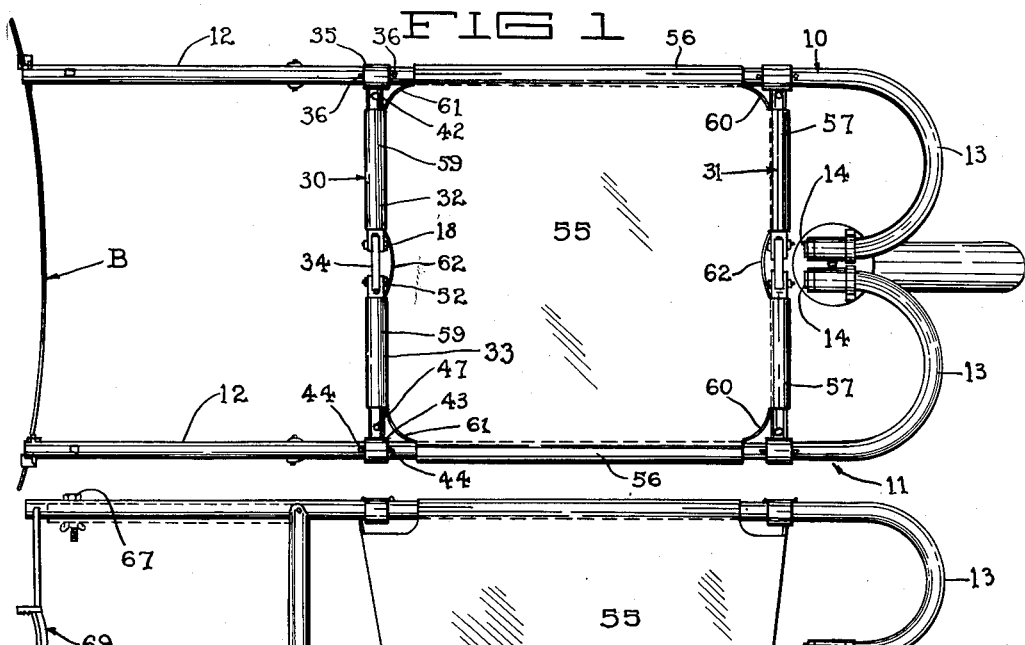
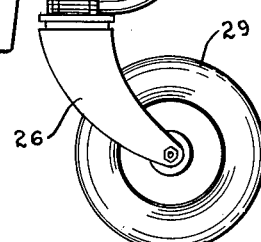
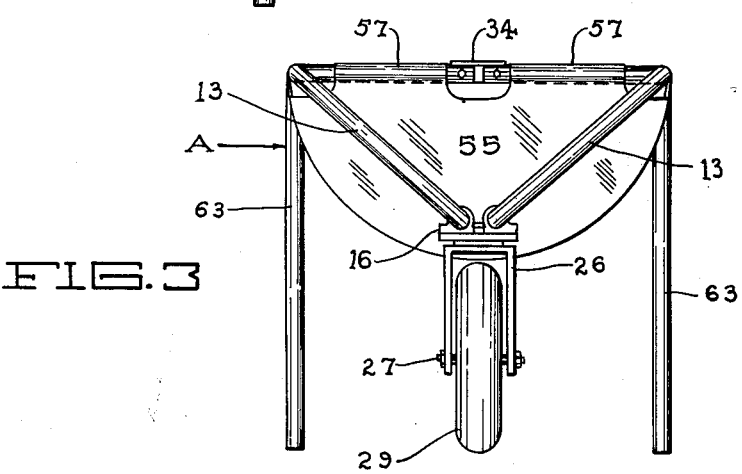
Inventor
ARTHUR E. REHNBERG
By Robert M. Dunning
Attorney Aug. 12, 1952  A. E. REHNBERG  2,606,771
COMBINATION WHEELBARROW AND TRAILER
Filed March 26, 1947  2 SHEETS—SHEET 2
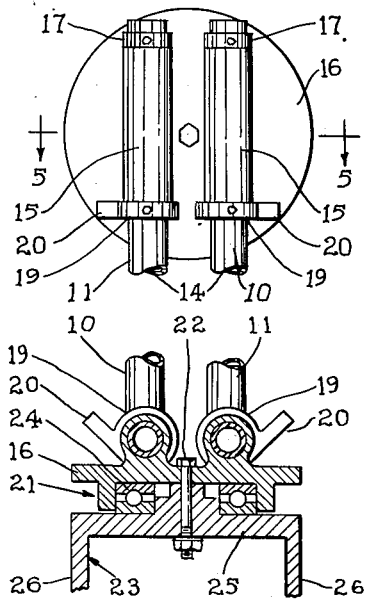
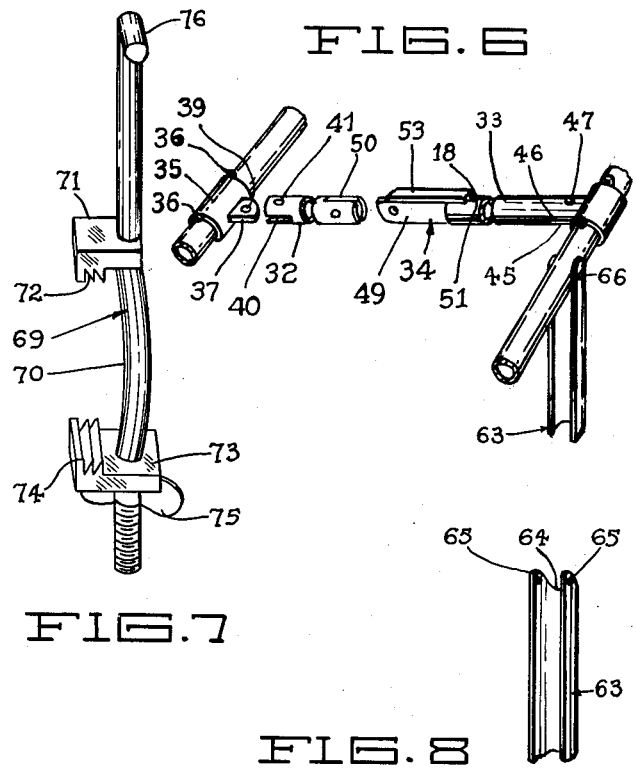
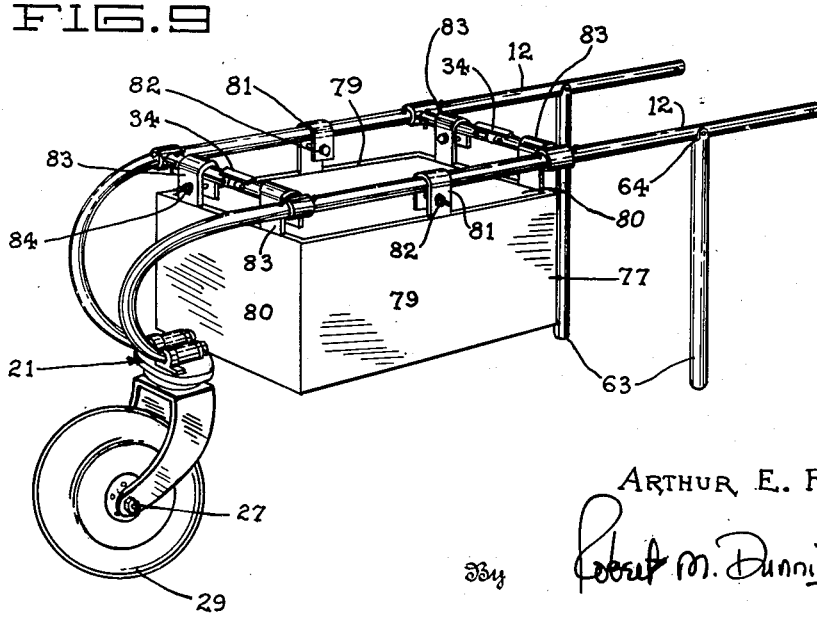
Inventor
ARTHUR E. REHNBERG
By Robert M. Dunning
Attorney Patented Aug. 12, 1952

2,606,771

UNITED STATES PATENT OFFICE 2,606,771

COMBINATION WHEELBARROW AND TRAILER

Arthur E. Rehnberg, St. Paul, Minn.

Application March 26, 1947, Serial No. 737,245

11 Claims. (Cl. 280—42)

My invention relates to an improvement in combination wheel barrow and trailer wherein it is desired to provide a device of this nature which may be used in a dual capacity.

Trailers are often used for carrying luggage and equipment which can not be conveniently stored in an automobile. In loading and unloading the trailer, however, it is often necessary to go substantial distances which are not accessible to the automobile. By providing a trailer which is so designed and constructed that it may be used as the wheel barrow, it is possible to greatly increase the usefulness of the apparatus.

It is the object of the present invention to provide a trailer constructed of strong but light weight material which is capable of supporting a considerable quantity of material, but which may be handled either as a trailer or as a wheel barrow. My trailer is particularly desirable for home owners who have only occasional need for either a wheel barrow or a trailer. It is also extremely desirable for campers and persons who own lake property as the material being hauled may be loaded onto the wheel barrow, carried to the automobile therein, hauled to a destination by the automobile and carried to unloading position while detached from the car.

A feature of the present invention resides in the provision of a device of the character described which is foldable into a small space when not in use. The combined trailer and wheel barrow may be folded into a substantially flat condition when not in use and thus may be stored in a garage or shed which is not of sufficient size to store a trailer or wheel barrow of usual construction.

A feature of the present invention lies in the provision of the apparatus of the character described having a body formed of heavy fabric or other suitable material which is flexible and foldable and is adaptable to receive objects of various shapes.

An added feature of the present invention lies in the provision of a trailer having a single caster wheel at one end thereof which is connected through a suitable fitting to the short ends of a pair of substantially J-shaped frame members. These frame members are foldable into parallel relationship when the apparatus is to be stored and are foldable into spaced relationship to provide opposite side supports for the body when in condition for use.

An additional feature of the present invention lies in the provision of a device of the character described having a pair of side frame members foldable together or into spaced relationship, and in providing a link so connecting these side frame members which holds the side frame members in definite fixed relationship when the apparatus is in position for use.

An added feature of the present invention lies in the provision of a device of the character described having side frame members foldable from adjacent to spaced relationship and in providing a pair of foldable connecting members between the side frame members which act as supports for the forward and rear ends of the flexible body.

These and other objects and novel features of my invention will be more clearly and fully set forth in the following specification and claims.

In the drawings forming a part of my specification:

Figure 1 is a top plan view of my combination trailer and wheel barrow showing the construction thereof.

Figure 2 is a side elevational view of the same.

Figure 3 is a front elevational view of the same.

Figure 4 is a top plan view of the member for connecting the side frame members to the supporting wheel.

Figure 5 is a sectional view of the connector, the position of the section being indicated by the line 5—5 of Figure 4.

Figure 6 is a diagrammatic view showing one of the cross members connecting the side frame members.

Figure 7 is a perspective view of a clamp which may be used for connecting the side frame members to the automobile bumper.

Figure 8 is a perspective view of one of the legs of my apparatus showing the construction thereof.

Figure 9 is a view of my combined trailer and wheel barrow showing a rigid body substituted for the flexible body thereof.

The combined trailer and wheel barrow includes a pair of substantially J-shaped side frame members 10 and 11 which are identical in design and form. Each of these members includes the elongated substantially straight handle portion 12 which is curved at one end to terminate in a pivot portion 13 in substantially parallel relationship with the handle portions 12. These side frame members 10 and 11 form the side supports for the body as will be later described in detail.

The ends 14 of the side frame members 10 and 11 are pivotally supported in a pair of parallel tubular supports 15 forming a part of the tube casting 16 of the wheel support. Collars 17 are provided on the ends of the frame member extremities 14 to hold the frame members engaged in their tubular bearings 15. Collars 19 are likewise provided on the frame member extremities 14 to cooperate with the collars 17 in holding the extremities 14 from axial movement in their bearings 15. Lugs 20 are provided on the collars 19 to engage against the upper surface of the casting 16 to limit rotative movement of the frame members 10 and 11 in one direction. When the frame members 10 and 11 are folded into adjacent relationship as indicated in Figure 5 of the drawings the lugs 20 will be spaced from the upper surface of the casting 16 but when the frame members 10 and 11 are in spread apart position the lugs 20 engage against the casting 16 to hold these frame members from further rotation.

The details of the hinge joint 21 are not important to the present invention. However, Figure 5 illustrates the casting 16 as being pivotally connected by a pivot bolt 22 to a wheel supporting bracket 23. A bearing 24 may be interposed between these elements to simplify the turning operation. The wheel supporting bracket 23 includes a top plate 25 and a pair of substantially parallel depending plates 26 between which the pivotal axis 27 of the wheel 29 extends.

The side frame members 10 and 11 are connected by a pair of cross connecting members 30 and 31. The cross member 31 connects the side frame members at a point near the curved ends 13 thereof, while the cross member 30 is at a substantial distance from the cross member 31. The cross members are generally identical in form and accordingly the detail construction of these arms may be similarly described.

Each of the cross pieces 30 and 31 includes a pair of links 32 and 33 which are pivotally connected to a center connecting member 34. A tubular bearing 35 encircles the side frame member 10 and is rotatable relative thereto. This bearing is held from longitudinal movement on the frame member 10 by collars or cotter pins such as 36. The tubular bearing 35 is provided with a flat ear 37 projecting therefrom which is apertured at 39 to receive a pivot bolt.

The end of the link 32 is provided with a slot 40 at its end to receive the ear 37. A hole 41 is drilled through the link end to receive a pivot pin or bolt 42 which allows the link 32 to pivot in any plane containing the axes of the handle portion 12 of the frame member 10 and the link 32.

The frame member 11 is similarly provided with a bearing sleeve 43 held from longitudinal movement by cotter pins 44 or other equivalent means. The bearing sleeve 43 is provided with a projecting ear 45 which is drilled to accommodate a pivot bolt. The link 33 is provided with a slot 46 in its outer end, which slot is designed to receive the ear 45. A pivot bolt 47 extends through the slotted end of the link 33 and through the ear 45 to support the link 33 pivotal on any plane which contains the axes of both the link 33 and handle portion 12 of the frame member 11.

The central connecting element 34 comprises a flat elongated body 49 which is designed to engage in vertical slots 50 and 51 in the adjacent ends of the links 32 and 33. A pivot bolt 18 pivotally connects the center member 34 to the link 32 while a similar pivot bolt 52 pivotally connects the link 32 to this center member. A bar 53 extends along the top of the frame body 49 to limit the pivotal motion of the links 32 and 33 relative to the center member 34 in one direction.

It will be seen that as the side frame members are pivoted into adjacent relationship, the links 32 and 33 must pivot relative to each other to reach vertical parallel relationship. During this pivotal movement the sleeves 35 and 43 rotate about their respective side frame members to allow this action to take place. When the links 32 and 33 are in vertical parallel relationship, they can both be folded in unison about the pivots 42 and 47 so that the links 32 and 33 lie parallel to the handle portions 12 of the side frame members 10 and 11. However, when the side frame members are in separated relation the cross members form a rigid link therebetween.

The body portion of the combined trailer and wheel barrow is indicated by the numeral 55. This body portion comprises in preferred form a sack like member of fabric or other suitable material. This body 55 is provided along opposite side edges with tubular sleeve portions 56 which are designed to embrace the portion of the side frame members which lie between the cross braces 30 and 31. The front end of the body 55 is likewise provided with a pair of spaced aligned sleeves 57 which embrace the arms 32 and 33 of the front cross member 31 on opposite sides of the center connecting member 34. The opposite end of the body 55 is likewise provided with a pair of aligned sleeve portions 59 which embrace the arms 32 and 33 of the cross member 30 on opposite sides of the center connecting member 34. Between the side sleeve portions 56 and the end sleeve portions 57 the body is cut away at 60 so as not to interfere with the folding operation. Similarly between the sleeve members 56 and the end sleeves 59 the body is cut away at 61 to avoid interference with the folding operation. The body is also cut away at 62 between the aligned end sleeve portions to avoid interference with the folding operation of the central connecting members 34 of the cross members 30 and 31.

The side portions 12 of the side frame members 10 and 11 are provided with foldable legs which may act to support the body when the device A is being used as a wheel barrow. The legs 63 are substantially semi-circular in cross section and are centrally notched at 64 adjacent the upper edge thereof to provide a pair of spaced parallel upwardly projecting arms 65 designed to extend on opposite sides of the frame portions 12. Pivot bolts 66 extend transversely through the frame portions 12 and through the ears 65 of the legs 63 to pivotally connect the legs to the frame members. The legs 63 are of proper radius to fit closely about the frame portions 12 when not in use and may be held in elevated position by any suitable means. In Figure 2 of the drawings I disclose bolt means 67 which may extend through the frame portions 12 and through the legs 63 in elevated position thereof to hold the legs in this elevated position.

The means for holding the ends of the side frame members 10 and 11 to the bumper B of an automobile or the like is best illustrated in Figure 7 of the drawings. This connecting means includes in preferred form an upright bar 69 which is bent outwardly at 70 to fit the outer curvature of a bumper. A fixing lug 71 having downwardly projecting teeth 72 is designed to engage the upper edge of the bumper B while a cooperable movable lug 73 is slidably mounted on the lower end of the bar 69 and is provided with upwardly directed teeth 74 designed to engage the lower edge of the bumper. A wing nut 15 or other suitable clamping element is threadably secured on the lower end of the rod 69.

As best illustrated in Figure 7 the upper extremity of the bar 69 is bent laterally as indicated at 76 and is designed to engage in a suitable transverse aperture in the free ends of the handle portions 12 of the side frame members 10 and 11. If desired cotter pins or other means may be provided to hold the side frame members engaged with the members 69.

In Figure 9 of the drawings I disclose the manner in which a rigid box may be substituted for the flexible body of my apparatus if it is so desired. In this construction the caster wheel, the wheel support, the side frame members, the cross frame members, and the legs are identical to those of the structure previously described. However, in the structure shown in Figure 9 the flexible body 55 has been removed from the frame and a rigid body indicated in general by the numeral 77 is substituted therefor.

The body 77 comprises a rigid box having a closed bottom which is not illustrated, and upwardly extending side walls 79 and end walls 80 thereupon. A substantially J-shaped bracket 81 extends upwardly from a point near the longitudinal center of each of the side walls 79, the long side of the J being connected to the side walls and the short end thereof forming a downwardly directed hook engageable over the side frame portions 12. Bolts 82 may extend through the opposite sides of the bracket if so desired to hold the body securely in place.

A pair of inverted J-shaped brackets 83 extend upwardly in spaced relation from each end wall 80 of the body 77. These brackets 83 are designed to hook over cross members 30 and 31 on opposite sides of the center connecting members 34 thereof. Bolts 84 may extend through the brackets 83 if desired to hold the body 77 securely in place.

With the construction illustrated in Figure 9 of the drawings the frame is still collapsible, but it is necessary to detach the body from the frame before the frame can be folded. The body 77 is designed as an attachment to the trailer for use when a rigid body is essential.

In accordance with the patent statutes, I have described the principles of construction and operation of my combined wheel barrow and trailer, and while I have endeavored to set forth the best embodiment thereof, I desire to have it understood that obvious changes may be made within the scope of the following claims without departing from the spirit of my invention.

I claim:

1. A device of the class described comprising a pair of side frame members, each member including generally parallel upper and lower portions and an interconnecting portion, a wheel support secured to the lower portions of the frame members, a pair of cross members foldable intermediate their ends connecting said frame members at spaced points, and a flexible body suspended from said frame members and said cross members and foldable with said cross members.

2. A device of the character described comprising a pair of frame members arranged in generally parallel relationship, each member including generally parallel upper and lower portions and an interconnecting portion, a wheel support, longitudinally extending generally parallel bearings thereupon, said bearings forming means pivotally connecting the lower portions of said frame members to said wheel support to pivot into adjacent relationship or into spaced relationship, a caster wheel supported by said wheel support, and a body supported by said frame members out of vertical alignment with said wheel.

3. A device of the character described comprising a pair of substantially parallel frame members, each member including generally parallel upper and lower portions and an interconnecting portion, a wheel support having longitudinally extending generally parallel bearings thereon, said bearing forming means pivotally connecting the lower portions of said frame members to said wheel support to support said frame members pivotal from spaced relation to adjacent relation, a caster wheel supported by said wheel support, and a flexible body supported by said frame members.

4. A device of the character described comprising a pair of substantially J-shaped frame members, a wheel support, a pair of longitudinally extending substantially parallel bearings on said wheel support in which the short ends of said frame members are pivotally engaged, a caster wheel supported by said wheel support, and a body supported by said frame members.

5. A device of the character described comprising a pair of longitudinally extending substantially J-shaped frame members, a wheel support, a pair of substantially parallel bearings on said wheel support engaging the short ends of said frame members to pivotally support the same, a caster wheel supported by said wheel support, and brace means operable to hold the long ends of said parallel frame members in parallel spaced relationship.

6. A device of the character described comprising a wheel support, a caster wheel supported by said wheel support, a pair of longitudinally extending substantially parallel bearings on said wheel support, a pair of substantially parallel frame members, each member including generally parallel upper and lower portions and an interconnecting portion, means connected to the lower portions of said frame members and supported in said bearings to support said frame members pivotal from adjacent relationship to spaced relationship, and foldable brace means interposed between said frame members.

7. A device of the character described comprising a wheel support, a wheel supported thereby, a pair of longitudinally extending parallel bearings on said support, a pair of substantially J-shaped frame members having the short ends thereof engaged in said bearings and pivotally supported thereby, the long ends of said frame members being pivotal from substantially parallel spaced relationship to substantially parallel adjacent relationship, a pair of cross braces pivotally connected to the long ends of said frame members, said braces being foldable upon folding movement of said frame members.

8. A device of the character described comprising a wheel support, a wheel supported thereby, a pair of longitudinally extending parallel bearings on said support, a pair of substantially J-shaped frame members having the short ends thereof engaged in said bearings and pivotally supported thereby, the long ends of said frame members being pivotal from substantially parallel spaced relationship to substantially parallel adjacent relationship, a pair of cross braces pivotally connected to the long ends of said frame members, said braces being foldable upon folding movement of said frame members, each of said cross braces including a pair of links pivotally connected together.

9. A device of the character described comprising a wheel support, a wheel supported thereby, parallel bearings on said support, a pair of substantially J-shaped frame members having the short ends thereof engaged in said bearings and pivotally supported thereby, the long ends of said frame members being pivotal from substantially parallel spaced relationship to substantially parallel adjacent relationship, a pair of cross braces pivotally connected to the long ends of said frame members, said braces being foldable upon folding movement of said frame members, said braces being pivotal into vertical parallel relationship upon the folding of said frame members together, and pivot means connecting said links to said frame members, whereby said folded links may be simultaneously folded into substantially parallel relation with said frame members.

10. A device of the character described comprising a pair of substantially J-shaped frame units, a wheel support, means for pivoting the short ends of said frame unit about their axes along parallel longitudinally extending axes to said wheel support, a wheel supported by said wheel support, a body supported between the long ends of said frame members, and a pair of legs foldably connected to the long ends of said frame members and foldable into substantially parallel relation thereto.

11. A device of the character described comprising a wheel support, a wheel supported thereby, a pair of substantially parallel bearings connected to said wheel support, a pair of substantially J-shaped frame units having the short ends thereof pivoted about their axes in said bearings, a body supported by the long ends of said frame members, and means cooperable between the short ends of said frame members and said wheel support to limit relative pivotal movement therebetween.

ARTHUR E. REHNBERG.

REFERENCES CITED

The following references are of record in the file of this patent:

UNITED STATES PATENTS

| Number | Name | Date |
|---|---|---|
| 120,159 | McKibbin | Oct. 24, 1871 |
| 674,710 | Pierce | May 21, 1901 |
| 704,426 | Allen | July 8, 1902 |
| 1,242,418 | Booth | Oct. 9, 1917 |
| 1,428,000 | Bens | Sept. 5, 1922 |
| 2,264,121 | Pattiani | Nov. 25, 1941 |
| 2,422,331 | Bates | June 17, 1947 |
| 2,431,834 | Sinclair | Dec. 2, 1947 |

FOREIGN PATENTS

| Number | Country | Date |
|---|---|---|
| 360,183 | Germany | Sept. 30, 1922 |